(12) United States Patent
Kalouche

(10) Patent No.: US 12,258,216 B2
(45) Date of Patent: Mar. 25, 2025

(54) AUTOMATED DELIVERY VEHICLE

(71) Applicant: Nimble Robotics, Inc., San Francisco, CA (US)

(72) Inventor: Simon Kalouche, San Francisco, CA (US)

(73) Assignee: Nimble Robotics, Inc., San Francisco, CA (US)

( * ) Notice: Subject to any disclaimer, the term of this patent is extended or adjusted under 35 U.S.C. 154(b) by 852 days.

(21) Appl. No.: 17/343,894

(22) Filed: Jun. 10, 2021

(65) Prior Publication Data

US 2021/0387808 A1 Dec. 16, 2021

Related U.S. Application Data

(60) Provisional application No. 63/037,741, filed on Jun. 11, 2020.

(51) Int. Cl.
*B25J 15/00* (2006.01)
*B25J 9/02* (2006.01)
(Continued)

(52) U.S. Cl.
CPC ............ *B65G 1/1376* (2013.01); *B25J 9/026* (2013.01); *B60P 3/007* (2013.01); *B65G 67/24* (2013.01);
(Continued)

(58) Field of Classification Search
CPC ........... B25J 9/026; B25J 15/00; B65G 1/137; B65G 1/1373; B65G 1/1378;
(Continued)

(56) References Cited

U.S. PATENT DOCUMENTS 9,256,852 B1 2/2016 Myllymaki
9,272,845 B2 3/2016 Honkanen et al.
(Continued)

FOREIGN PATENT DOCUMENTS

CN 107415795 A 12/2017
EP 2256703 A1 12/2010
(Continued)

OTHER PUBLICATIONS

International Search Report for Appln. No. PCT/US2021/036800 dated Oct. 20, 2021. (3 pages).

*Primary Examiner* — Patrick H Mackey
(74) *Attorney, Agent, or Firm* — POLSINELLI PC

(57) ABSTRACT

An order fulfillment and delivery system for autonomously fulfilling orders while en route to a delivery location. The system includes a delivery vehicle having a storage area, a robotic system at least partially disposed within the storage area and one or more processors. The one or more processors being configured to receive an order of one or more inventory items, generate container retrieval instructions for the robotic system to perform based on the received order and transmit to the robotic system the container retrieval instructions to perform. The robot system includes a container retrieval device movable in at least two dimensions to engage and move a container, based upon the container retrieval instructions, from a first location within the delivery vehicle to a second location within the delivery vehicle.

20 Claims, 10 Drawing Sheets

(51) Int. Cl.
    *B60P 3/00*         (2006.01)
    *B65G 1/137*       (2006.01)
    *B65G 67/24*       (2006.01)
    *B60P 1/36*         (2006.01)
    *B60P 1/43*         (2006.01)
    *B60W 60/00*       (2020.01)

(52) U.S. Cl.
    CPC .................. *B25J 15/00* (2013.01); *B60P 1/36*
    (2013.01); *B60P 1/43* (2013.01); *B60W*
    *60/00256* (2020.02)

(58) Field of Classification Search
    CPC .......... B65G 1/0485; B60P 3/007; B60P 1/36;
    B60P 1/43; B60W 60/00256; G06Q
    10/083
    See application file for complete search history.

(56) References Cited

U.S. PATENT DOCUMENTS

| | | | |
|---|---|---|---|
| 9,520,012 | B2 | 12/2016 | Stiernagle |
| 9,796,080 | B2 | 10/2017 | Lindbo et al. |
| 9,868,596 | B2 | 1/2018 | Worsley et al. |
| 10,273,085 | B2 * | 4/2019 | Battles ................ B65G 63/002 |
| 10,875,057 | B2 * | 12/2020 | Wagner .................... B07C 5/02 |
| 10,890,921 | B2 | 1/2021 | Gillett |
| 2011/0238207 | A1 | 9/2011 | Bastian, II et al. |
| 2015/0069001 | A1 | 3/2015 | French et al. |
| 2016/0247212 | A1 | 8/2016 | Shimmerlik et al. |
| 2016/0349350 | A1 | 12/2016 | Borders et al. |
| 2017/0225601 | A1 | 8/2017 | Borders et al. |
| 2017/0290345 | A1 | 10/2017 | Garden et al. |
| 2018/0086575 | A1 | 3/2018 | McCarthy et al. |
| 2018/0099415 | A9 | 4/2018 | McCollum et al. |
| 2018/0154399 | A1 | 6/2018 | Wagner et al. |
| 2018/0265296 | A1 | 9/2018 | Beckman et al. |
| 2018/0290845 | A1 | 10/2018 | McMurrough et al. |
| 2018/0349872 | A1 | 12/2018 | Ahmed et al. |
| 2018/0362270 | A1 | 12/2018 | Clucas et al. |
| 2019/0034857 | A1 | 1/2019 | Ferguson et al. |
| 2019/0050798 | A1 | 2/2019 | Goldberg et al. |
| 2019/0050952 | A1 | 2/2019 | Goldberg et al. |
| 2019/0161190 | A1 | 5/2019 | Gil et al. |
| 2020/0017317 | A1 | 1/2020 | Yap et al. |
| 2020/0062505 | A1 | 2/2020 | Chirnomas |
| 2020/0150674 | A1 | 5/2020 | Ferguson et al. |
| 2020/0209865 | A1 | 7/2020 | Jarvis et al. |
| 2020/0354171 | A1 * | 11/2020 | Vincent .................. B65G 67/24 |
| 2020/0377317 | A1 | 12/2020 | Zoghzoghy et al. |
| 2021/0032034 | A1 | 2/2021 | Kalouche |
| 2021/0132625 | A1 | 5/2021 | Gillett |
| 2021/0179364 | A1 * | 6/2021 | Zhang .................. B65G 1/0464 |
| 2021/0261337 | A1 | 8/2021 | Schedlbauer et al. |
| 2021/0283783 | A1 | 9/2021 | Gillett |
| 2021/0316945 | A1 * | 10/2021 | Lui .......................... B60P 3/007 |
| 2024/0174464 | A1 * | 5/2024 | Moser .................... B65G 1/137 |

FOREIGN PATENT DOCUMENTS

| | | |
|---|---|---|
| EP | 3115319 A1 | 1/2017 |
| GB | 2551909 A | 1/2018 |
| GB | 2568768 A | 5/2019 |
| WO | 2019232505 A1 | 12/2019 |
| WO | 2020057571 A1 | 3/2020 |

* cited by examiner

AUTOMATED DELIVERY VEHICLE

CROSS-REFERENCE TO RELATED APPLICATIONS

This application claims the benefit of the filing date of U.S. Provisional Patent Application No. 63/037,741 filed Jun. 11, 2020, the disclosure of which is hereby incorporated herein by reference.

BACKGROUND OF THE DISCLOSURE

The present disclosure relates to delivery vehicles and, more particularly, to delivery vehicles equipped with robotic systems for picking, packing, and fulfilling orders while traversing a delivery route.

Consumers generally find purchasing items online more convenient than purchasing items from brick-and-mortar stores. Using the internet, consumers can browse a greater selection of inventory, quickly compare the prices of similar items from one or more merchants, analyze reviews from previous consumers and order items directly to their doorstep without having to leave the comfort of their home.

Not all sectors of consumer goods, however, have seamlessly expanded to include convenient delivery options. For example, grocery and convenience stores have only recently began to take a small market share from their brick-and-mortar counterparts. It was previously surmised that consumers prefer to see and touch their groceries, particularly produce, meat, dairy, and bakery goods, to ensure item quality before purchase. Nevertheless, as delivery options for groceries and convenience items have become more readily available, it has become apparent that a large subset of the population appreciates the convenience of delivered groceries. This is especially true in cities and other densely populated areas where consumers often do not have access to personal vehicles that can easily transport groceries from the supermarket to their homes.

Despite the increased availability of grocery delivery services, these services are not without shortcomings. For example, grocery delivery services often include relatively expensive subscription costs and also require a minimum order before "free delivery" is provided, thus leaving consumers with no choice but to order several days-worth of groceries or pay an expensive delivery fee on top of their subscription. Moreover, delivery times often need to be reserved one or more days in advance, thereby making it difficult and expensive to impulsively buy and quickly receive only a few items. Furthermore, while some grocery delivery services allow consumers to modify and/or add to a pending order immediately after placing the order, once the order has been processed, further modifications are not permitted. In this respect, if a consumer wishes to modify and/or add one or more items after the purchase has been processed, the consumer is left with limited choices: pick-up the item from a brick-and-mortar store, pay another delivery fee and wait for the additional item, or forgo the additional item all together.

BRIEF SUMMARY OF THE INVENTION

In accordance with a first aspect of the present disclosure, an automated delivery vehicle is provided. Among other advantages, the automated delivery vehicle is equipped with a robotic system for fulfilling orders using inventory stored within the delivery vehicle. In this regard, new orders can be processed and fulfilled while the delivery vehicle traverses a delivery route. As a result, the orders can be delivered to customers more quickly and cost effectively than traditional grocery and convenience delivery services that fulfill orders in a warehouse and then subsequently transport and deliver the orders to customers in two distinct steps. In addition, orders can be modified much later in the order fulfillment process compared to the conventional delivery services. The automated delivery vehicle described herein can thus capitalize on profits from additional orders and/or add on items without meaningfully increasing delivery costs.

In one embodiment, an order fulfillment and delivery system includes a vehicle having a storage area, a robotic system disposed at least partially within the storage area, and one or more processors. The processors are configured to receive an order of one or more inventory items, generate container retrieval or pick instructions for the robotic system to perform based on the received order and transmit to the robotic system the container retrieval instructions to perform. The robotic system includes an extendable container retrieval device to engage and move a container from a first location within the delivery vehicle to a second location within the delivery vehicle.

In another embodiment, a method of fulfilling and delivering orders includes: receiving, by one or more processors, an order comprising one or more items; generating, by the one or more processors, instructions for a robotic system disposed at least partially within a storage area of a delivery vehicle, the robotic system including a container retrieval device; providing, by the one or more processors, the instructions to the robotic system; extending the container retrieval device to engage a first container; moving the engaged container from a storage location within the delivery vehicle to a picking area located within the delivery vehicle; and picking an item from the first container and placing the picked item within a second container.

BRIEF DESCRIPTION OF THE DRAWINGS

Various embodiments of the present disclosure are described herein with reference to the drawings, wherein.

DETAILED DESCRIPTION

The technology disclosed herein relates to an automated fulfillment and delivery vehicle. The vehicle includes a robotic system designed to fulfill new orders, modify earlier placed orders and stage completed orders while en route to a delivery location. As a result, the time from order placement to order delivery can be drastically reduced. While the orders discussed herein are primarily described as groceries and/or other items traditionally purchased at a supermarket or convenience store, the terms "inventory," "item," and the like, are intended to encompass any type of product purchasable at a traditional brick-and-mortar store, restaurant, or online. Also as used herein, the terms "substantially," "generally," "approximately" and "about" are intended to mean that slight deviations from absolute are included within the scope of the term so modified.

Figure 1:
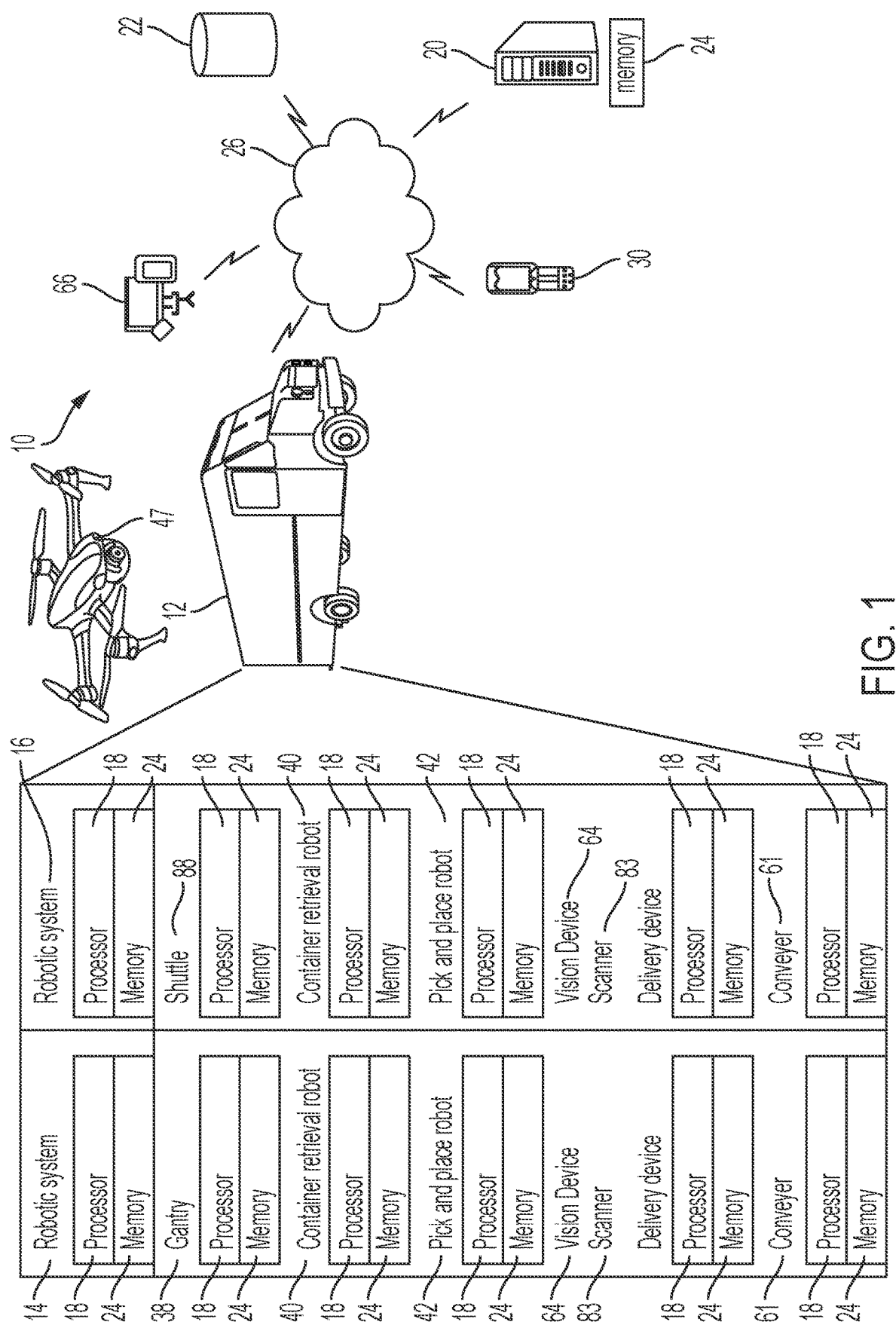
FIG. 1 is a block diagram of an order fulfillment system including an automated delivery vehicle provided with a robotic system having a piece-picking robot according to an embodiment of the present disclosure.

FIG. 1 is a block diagram of an example order fulfillment and delivery system 10 according to an embodiment of the present disclosure. System 10 includes an automated delivery vehicle 12 equipped with a robotic system such as robotic system 14 (FIG. 2A), or robotic system 16 (FIG. 11), to fulfill orders as the delivery vehicle traverses a delivery route. While delivery vehicle 12 is described herein as a delivery truck, it will be understood that the term "vehicle" is inclusive of any motor vehicle such as trucks, sports utility vehicles (SUV), step vans, buses, or commercial motor vehicles such as eighteen-wheelers; watercraft including boats, ferries, and ships; and aircraft including but not limited to drones, blimps, planes and helicopters. Order fulfillment and delivery system 10 further includes one or more processors 18 associated with robotic systems 14, 16, one or more remote processors 20, data store 22, memory 24, one or more network devices 26 and optionally one or more consumer devices 30.

Processor 18 and remote processor 20 may be a commercially available central processing unit ("CPU"), a System on a Chip ("SOC"), an application specific integrated circuit ("ASIC"), a microprocessor, microcontroller, or other such hardware-based processor. In some instances, system 10 may include multiple processor types. Although FIG. 1 illustrates a single delivery vehicle 12, it will be appreciated that the system can include more than one delivery vehicle, each of which are in communication with one or more remote processors 20. As used herein, the term "remote processor" refers to a processor in communication with and located remote from the robotic systems within delivery vehicle 12 and may include one or more processors or a single central processor for coordinating and automating fulfillment tasks between multiple delivery vehicles. When the term "processor" is used herein, the term refers to either a processor of robotic system 14, robotic system 16, remote processor 20, another processor, or a combination of the foregoing, unless explicitly indicated otherwise.

Memory, such as memory 24, may be configured to read, write, and store data. Memory 24 may be any solid state or other such non-transitory type memory device. For example, memory 24 may include one or more of a hard-drive, a solid state hard drive, NAND memory, flash memory, ROM, EEPROM, RAM, DVD, CD-ROM, write-capable, and read-only memories, or any other device capable of storing data. Data may be retrieved, manipulated, and/or stored by processor 18 or remote processor 20 in memory 24.

The network device, such as network device 26, is configured to communicatively couple the components of robotic system 14 and/or the components of robotic system 16 to other components of the robotic systems and to other devices or systems, such as data store 22 and consumer device 30. In this regard, network device 26 may enable processor 18 and processor 20 to communicate and receive data, such as inventory and order information, and signal other computing devices or data store 22. The network device 26 may include a network interface card (NIC), Wi-Fi card, Bluetooth receiver/transmitter, or other such device capable of communicating data over a network via one or more communication protocols, such as point-to-point communication (e.g., direct communication between two devices), Ethernet, Wi-Fi, HTTP, Bluetooth, LTE, 3G, 4G, 5G, Edge, etc., and various combinations of the foregoing. Consumer device 30 may be a computer, tablet, smartphone, smartwatch or the like which a consumer may use to purchase one or more inventory items over network 26.

Figure 2A:
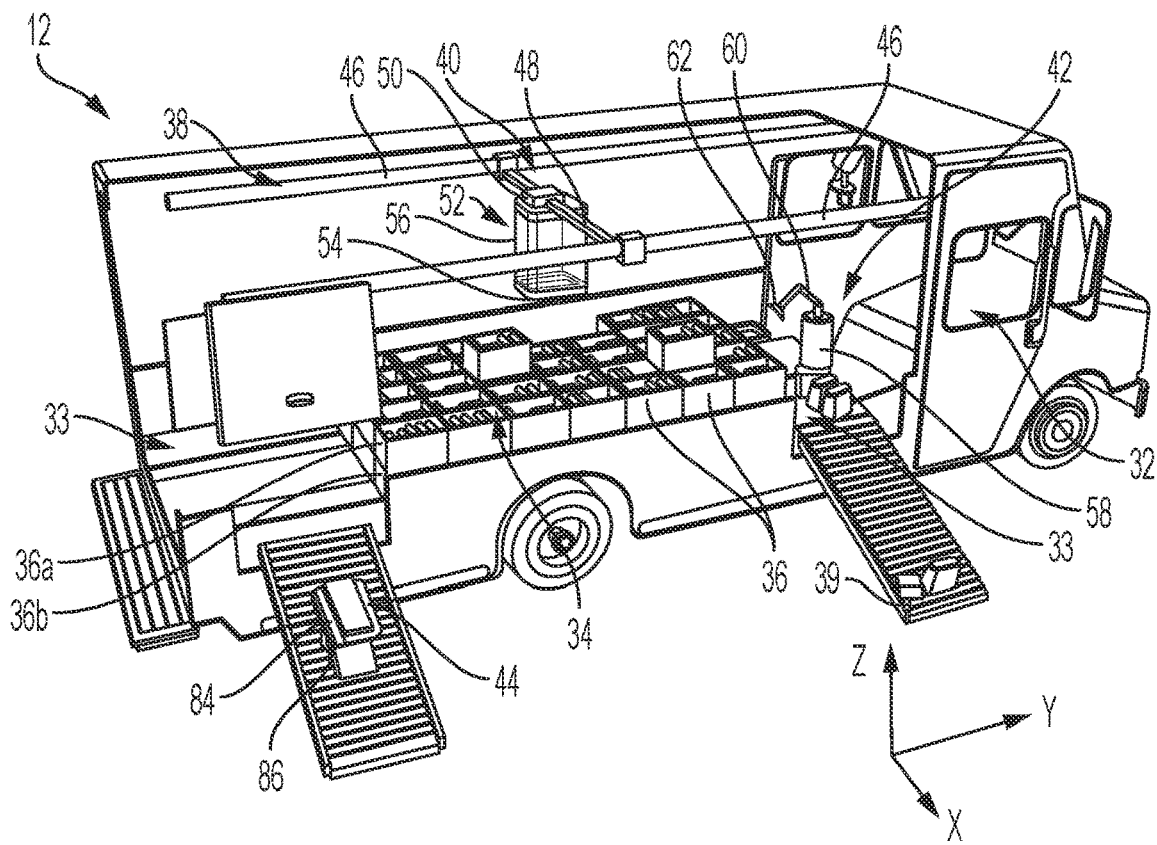
FIG. 2A is a schematic cutaway view of an example automated delivery vehicle including a robotic system with a gantry according to an embodiment of the present disclosure.

Referring to FIG. 2A, delivery vehicle 12 may be a delivery truck in the form of a step van and thus is sometimes be referred to herein as a "delivery truck" or simply a "truck." Delivery truck 12 includes a cab 32, a storage area 34 in which a plurality of stackable containers 36 may be stored and a staging area 33 in which fulfilled orders are placed prior to delivery. In some embodiments, a driver may sit within cab 32 while driving truck 12 along its delivery route. The driver and/or another passenger riding within cab 32 may assist the robotic systems in performing any automated order fulfillment task including, for example, picking items from retrieved storage containers and placing those items in order containers, delivering order containers from the truck to designated drop zones at a delivery location and retrieving empty containers from pickup locations and placing the empty containers into the truck. In other embodiments, delivery truck 12 is autonomously operable and designed to drive itself along a delivery route as is generally known in the art. Delivery truck 12 may be equipped with Light Detection and Ranging (LIDAR), visual sensors, cameras, or other mapping sensors that capture environmental data to map out the environment and localize the vehicle along the delivery routes to improve the truck's self-driving capabilities. When delivery truck 12 is autonomously operable, cab 32 is not necessary.

As shown in FIG. 2A, containers 36 may be arranged within the storage area 34 of delivery truck 12 in a plurality of rows extending in a direction along the length of the truck (e.g., the y-direction), a plurality of rows extending in a direction along the width of the truck (e.g., the x-direction) and in vertical stacks extending from the storage bed toward the roof of the truck (e.g., the z-direction) such that little to no gap exists between adjacent rows of containers. This storage configuration maximizes storage density and also inhibits lateral movement of containers 36 as the truck traverses a delivery route. It will be appreciated that the containers may be arranged in any number of rows and any number of levels (e.g., the number of containers in each stack).

Delivery truck 12 may be stocked with containers 36 of orderable items (e.g., items that have not yet been assigned to a particular customer) and/or containers of pre-picked orders. The term "container" encompasses bins, totes, cartons, boxes, bags, and any other vessel capable of storing inventory items. To distinguish between containers holding orderable items and containers designated for a particular customer (e.g., containers holding pre-picked orders or containers holding items picked in transit), the term "storage container" will be used to identify containers housing orderable items and the term "order container" will be used to identify containers designated for a particular customer. Containers 36 may be configured to hold inventory items of a single product type or of a variety of product types and in certain instances may be subdivided into isolated sections using sub-divider walls. In some embodiments, containers 36 may be of uniform size to one another. In other embodiments, containers 36 may be of varying sizes and configured to hold particular product items.

In situations where the inventory items are groceries that require refrigeration, containers 36 may be provided with a section configured to hold dry ice, ice packs, or other disposable or decomposable refrigeration devices thereby alleviating the need for truck 12 to have a separate refrigeration unit. Alternatively, storage area 34 may include temperature regulators that control the temperature of one or more isolated refrigeration or freezer areas. One or more insulated walls or barriers may be used to isolate and insulate the zones and maintain the desired temperature or climate within the zones. Each refrigeration or freezer area may rely on cryogenic cooling to achieve a desired temperature, or may alternatively utilize a separate refrigeration system formed, for example, of a condenser, a compressor and an evaporator configured to cycle gas through the system to refrigerate and/or freeze the insulated area. The groceries may be arranged within storage area 34 in the refrigerated area, the frozen area or at ambient temperature based upon the storage requirements of that particular item. In some instances, grocery products may be naturally slotted closer to or further from the frozen and refrigerated area based upon the items temperature and storage climate requirements. In situations where the inventory items include food that requires preparation, the cab 32 or the storage area 34 of delivery truck 12 may include one or more convection ovens, microwaves, toasters, convection pans, stoves, coffee machines, or any other type of food preparation machine typically found in a commercial kitchen. The foregoing machines may thus be utilized by an operator, robotic system 14 or robotic system 16 to prepare one or more meals for a customer by mixing ingredients or preparing pre-made meal kits.

Figure 2B:
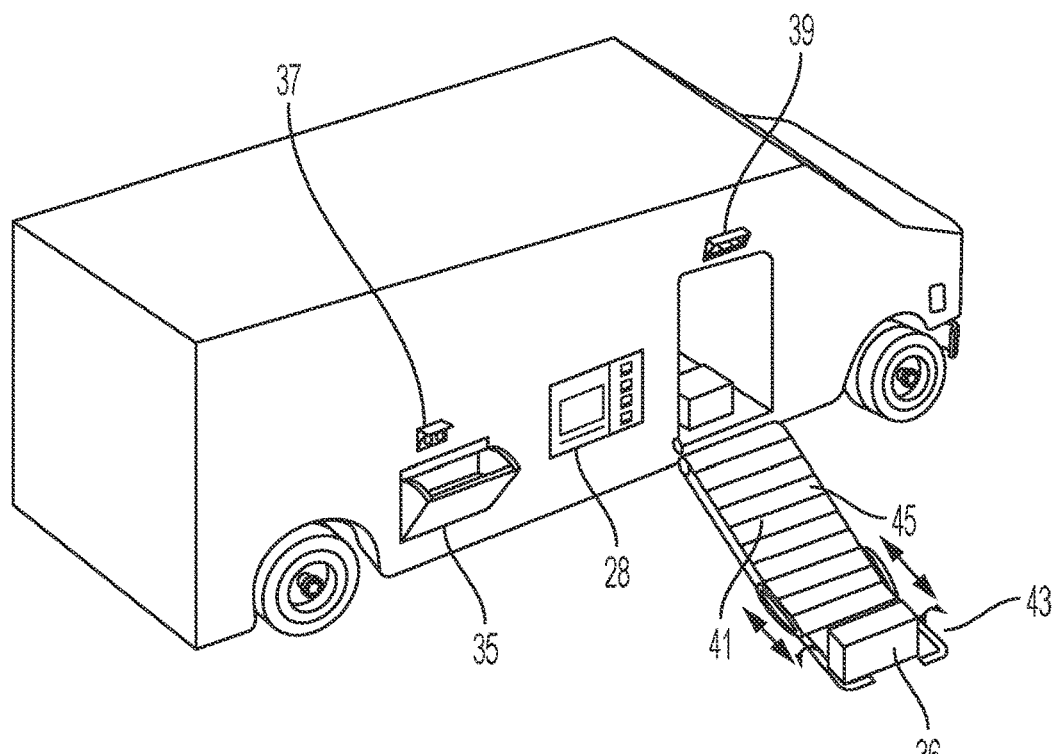
FIG. 2B is a perspective view of the delivery vehicle of FIG. 2A.

With reference to FIG. 2B, delivery truck 12 may include a port 35 (e.g., a "hand picking area") through which items can be presented to curbside customers. While port 35 is shown as a pivotable door, the term "port," as used herein, means any mechanism through which items can be presented to a customer located outside of truck 12 and may include a slidable door, an extendable tray or merely a hole. In this regard, if a customer prefers to hand-select a grocery item such as produce, meat, dairy, or a bakery good, the items may be retrieved by robotic system 14 or robotic system 16 (as requested by the customer through consumer device 30 or through a separate interface 28 on truck 12) and presented to the customer who may then hand-select one or more of the items from a container 36. Put differently, truck 12 may serve as a mobile store provided with a robotic system that retrieves products for the consumer to hand-select and purchase. A camera 37, or scanner, may be placed adjacent to port 35 to detect and verify the items and quantity of items taken by the customer so that the customer's account can be debited accordingly. Alternatively, a scale or weighing sensor (not shown) may be embedded within port 35 to detect and verify items removed from the port. An exterior of delivery truck 12 and/or ramp 41 may optionally include an additional alignment cameras 39, or sensor, to assist the driver (or self-driving program) in aligning the ramp with a designated drop zone at a delivery location in order to deliver the order container or to assist in aligning the ramp with a designated pickup location in order to retrieve an empty container.

Referring back to FIG. 2A, each container 36 preferably has an open or openable top through which inventory items can be deposited or retrieved. The bottom of containers 36 may include bomb bay doors or a wall that is slidable, pivotable, or otherwise actuatable from a closed position to an open position to dispense the inventory items into other containers, such as order containers, or elsewhere. In some embodiments, storage containers 36 may include a camera that transmits images to consumer device 30 thereby allowing the customer operating the device to select specific inventory items contained within the storage container. Order containers, on the other hand, may be sealed or have a lockable door (not shown) that is openable only by the intended consumer, for example, by entering a code, a manual lock (combination lock, pad lock, etc.), or confirming a wireless communication etc. The storage containers and the order containers may be foldable or otherwise collapsible to facilitate storage and improve transportability of the containers between uses.

Robotic system 14 includes a gantry 38, a retrieval robot 40 moveable about the gantry, a pick and place robot 42 and/or one or more delivery devices such as a delivery ramp 41, delivery robot 44 or drone 47. Gantry 38 includes a pair of opposing beams 46 extending in a first direction (e.g., the length direction of delivery truck 12) and a cross-connector 48 extending between the beams (in a direction perpendicular to the first direction) upon which retrieval robot 40 is movably mounted. The cross-connector 48 may include rollers, linear bearings and guides, linear actuators, lead or ball screws, belts or chain transmissions and actuators, or similar mechanisms, configured to controllably slide the cross-connector to a desired location along beams 46 upon executing a processor executable signal. Beams 46 may thus act as a track along which cross-connector 48 can slide, in the length direction of the truck, while the cross-connector acts as a track along which retrieval robot 40 can slide, in the width direction of the truck, to allow robotic system 14 to move containers 36 in three dimensions about the interior of the truck and complete various order fulfilment tasks. In some embodiments, containers 36 may include a position sensor capable of sending data to processor 18 to track the location of the containers as the containers are moved about the interior of truck 12. Alternatively, processor 18 can systematically log and track where each container is moved thereby removing the need to have sensors within each container 36.

Retrieval robot 40 includes a body 50 moveably mounted on cross-connector 48 and a lifting device 52. The body 50 of retrieval robot 40 may include rollers, linear bearings and guides, linear actuators, lead or ball screws, belts or chain transmissions and actuators, or another mechanism, that allows the body of the retrieval robot to slide along the cross-connector upon executing a processor executable signal. In this regard, body 50 can be moved quickly about gantry 38 to position lifting device 52 in two dimensions above any one of the stacks of containers 36.

Figure 3:
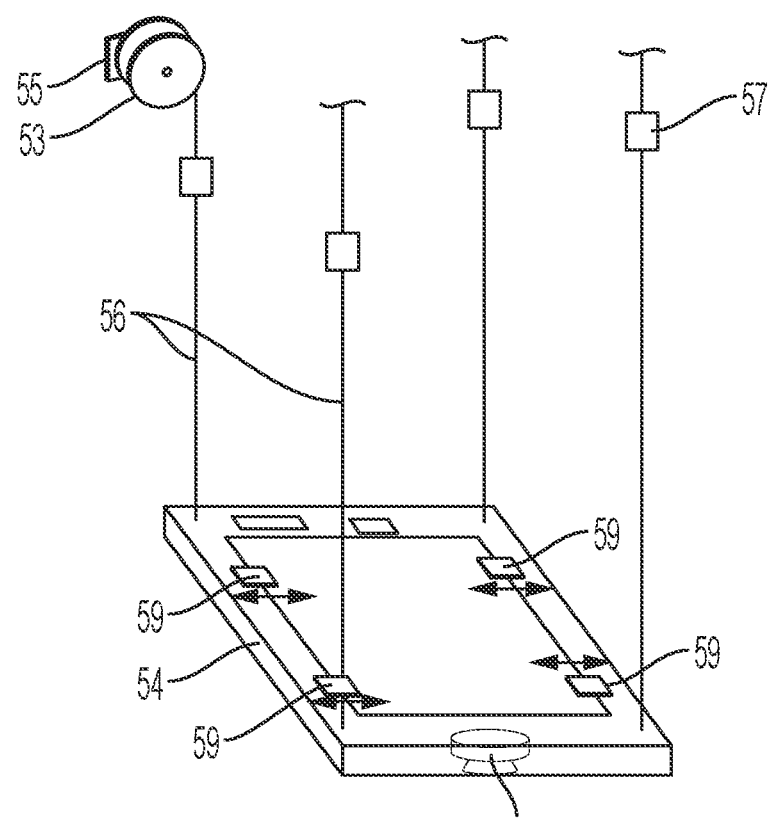
FIG. 3 is a schematic view of a gripper plate designed to be suspended from the gantry of FIG. 2A according to an embodiment of the present disclosure.

The lifting device 52, as shown in more detail in FIG. 3, includes a gripper plate 54 suspended from the body 50 of retrieval robot 40 by cables 56 which are connected to a winding mechanism 53 such as a spool, hoist, or winch housed within or otherwise coupled to the body of the retrieval robot. Cables 56 can be wound and unwound, or spooled into and out from, the body 50 of retrieval robot 40 to move gripper plate 54 in the z-direction. An encoder 55 may be coupled to winding mechanism 53 to measure the distance gripper plate 54 moves in the z-direction. Winding mechanism 53 may also include a torque sensor (not shown) to measures the weight of a container 36 supported by gripper plate 54. Alternatively, load cells 57, force sensors, strain gauges, contact switches or other sensors may be positioned between the body 50 of the retrieval robot 40 and gripper plate 54 to detect the weight of a payload. In this regard, autonomous inventory audits can be performed during order fulfillment tasks allowing processor 18 to determine the number of product items that have been removed from a container 36 to ascertain, for example, the number of items purchased by a customer or to determine when inventory within the containers are running low and need to be replenished.

Gripper plate 54 may include hooks 59 that are slidable, extendable, or otherwise moveable, relative to the plate such that the hooks may be slid into engagement with a container 36 or, more specifically, into a cavity, underneath a rib, or against another feature ("the engagement feature") formed within the top surface forming the rim and/or sidewalls of the container. Hooks 59 may be driven by a suitable drive mechanism housed within gripper plate 54, which may be powered and controlled by signals carried through cables 56, through a separate control cable (not shown), or wirelessly. Thus, when gripper plate 54 is lowered into engagement with the rim of a container 36, or to a position around the sidewall of the container, hooks 59 may be transitioned to engage the engagement feature of the container, thereby securely gripping the container and allowing retrieval robot 40 to move the container about the interior of delivery truck 12. Gripper plate 54 may also include a sensor 63, such as a camera, depth imager, contact switch, contact sensor, inductive sensor, capacitive sensor, IR sensor or similar device, to assist in aligning the gripper plate to the engagement feature of container 36. Sensor 63 can utilize markers such as AR tags or barcodes provided on containers 36, or other features of the container itself, to facilitate proper alignment. In addition to facilitating alignment, sensor 63 can capture images of inventory stored inside of the storage containers. The images may then be transmitted via network device 26 to user device 30 to allow a consumer to manually select specific groceries based upon actual images of the inventory items.

If retrieval robot 40 is tasked with retrieving a container ("target container") that is not located on the top of a particular stack of containers, then the overlying container 36a ("non-target containers") must first be moved to allow the retrieval robot access to target container 36b. The act of retrieving a target container 36b from underneath one or more non-target container 36b is referred to herein as "digging."

To perform a digging operation, retrieval robot 40 must first lift each of the overlying non-target containers 36a from the stack of containers in which the target container 36b is stored. Each of the non-target containers 36a may be lifted, transported, lowered and placed in a temporary location in which no containers are located, or on the top of another stack of containers. After each of the non-target containers 36a have been removed from the stack and relocated, target container 36b can be extracted by retrieval robot 40 and transported to another location, for example, another storage location or a picking area. After target container 36b has been extracted, non-target containers 36a may be placed back in the original stack to restore the original order of the stack less the target container. As mentioned above, each individual container may be tracked and logged, so that the appropriate containers can be transported by retrieval robot 40 about the interior (or exterior) of delivery truck 12 as needed. In one embodiment, vehicle 12 may additionally include a conveyor 61 (FIG. 1), or carousel, to assist in transporting, queuing, staging, or buffering containers 36 between storage area 34, the picking area, staging area 33 and a loading/unloading area.

Figure 4A:
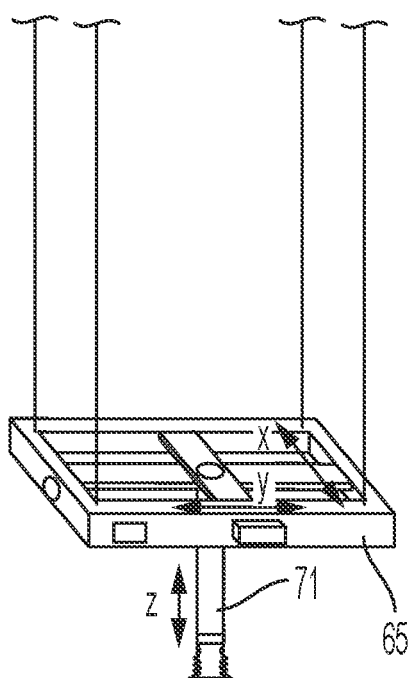
FIGS. 4A and 4B are schematic views of a gripper plate including a retractable manipulator designed to be suspended from the gantry of FIG. 2A according to another embodiment of the present disclosure.
Figure 4B:
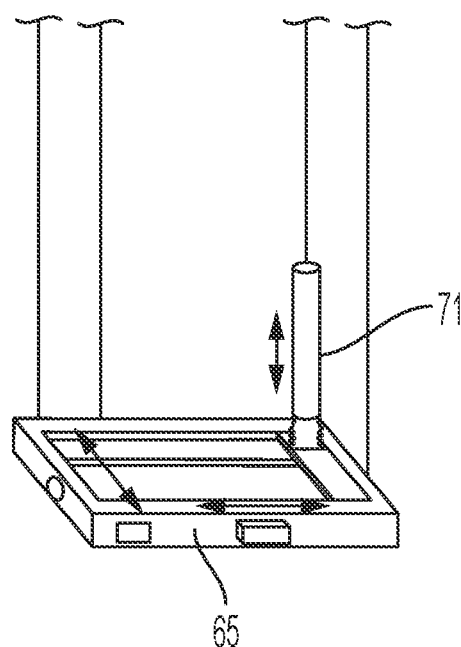
Figure 5:
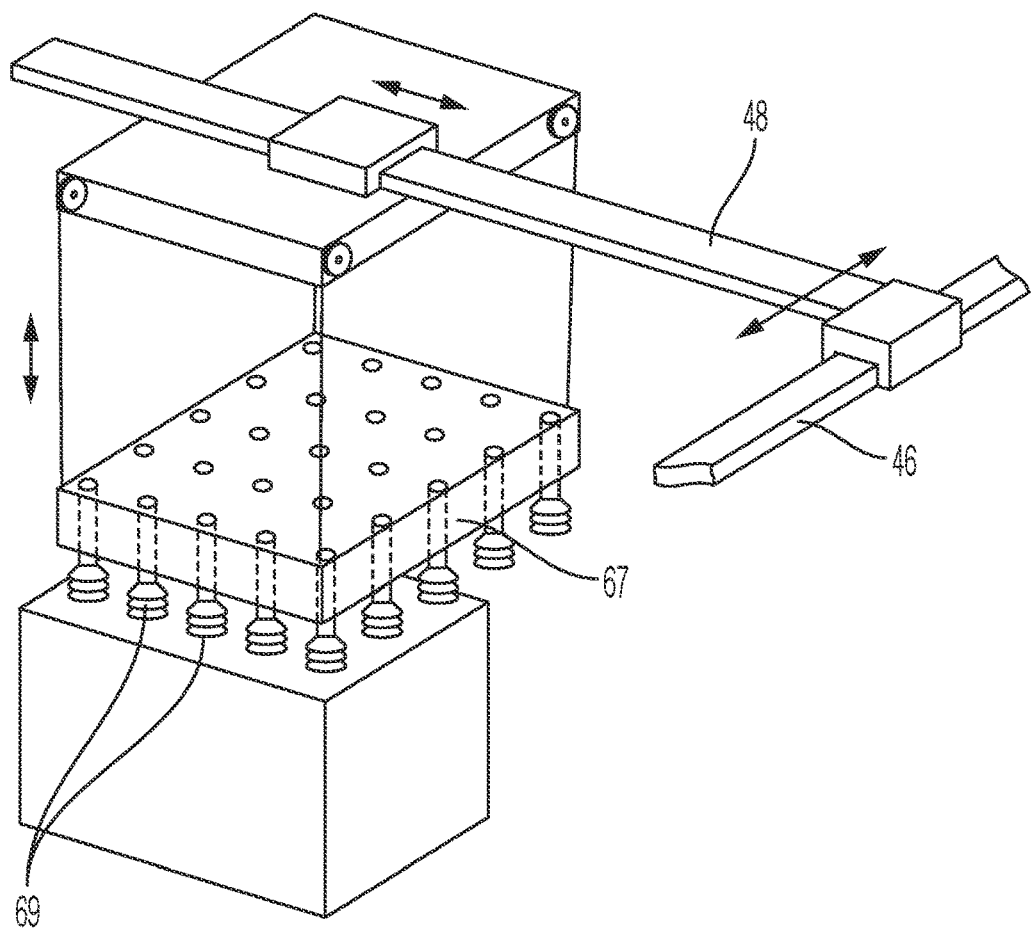
FIG. 5 is a schematic view of a gripper plate including a plurality of suction cups designed to be suspended from the gantry of FIG. 2A according to yet another embodiment of the present disclosure.

In a preferred embodiment, gripper plate 54 may be detachably coupleable to the body 50 of retrieval robot 40 such that the gripper plate may be autonomously swapped (upon receiving control instructions from processor 18) with a different gripper plate such as gripper plate 65 (FIGS. 4A and 4B) or gripper plate 67 (FIG. 5). As shown in FIG. 5, gripper plate 67 includes an array of suction cups 69 which may be utilized to move containers 36, including without limitation, bins, boxes or cartons. On the other hand, gripper plate 65 may include all of the features of gripper plate 54 and additionally include a manipulator 71 having at least three degrees of freedom relative to the griper plate and a gripping tool, such as a suction cup, attached to the manipulator. As shown in FIG. 4A, manipulator 71 may be extended to freely position the suction cup within a target container 36b to grasp and pick individual items from the target container (so long as there is not a non-target container 36a positioned on top of the target container). After the items have been picked, manipulator 71 may be retracted, as shown in FIG. 4B (e.g., upwards in the z-direction), to increase the clearance between gripper plate 65 and containers 36 as the gripping plate is moved about the interior of truck 12.

Referring back to FIG. 2A, one or more pick and place robots 42 may be positioned within a picking area of vehicle 12 and tasked with picking individual items from the storage containers and depositing the picked items into order containers. Pick and place robot 42 may operate in one of two modes: an autonomous mode, by executing autonomous control instructions, or a teleoperated mode, in which the control instructions are manually piloted (e.g., directly controlled) by a teleoperator located within vehicle 12 or by a teleoperator located outside the vehicle.

Pick and place robot 42 includes a base 58, a picking arm 60 coupleable to a gripping tool 62 for picking and packing items and one or more vision devices 64. The one or more vision devices 64 may be directly connected to the base 58, the picking arm 60, the gripping tool 62 or located in the environment surrounding the robot in a manner in which the vision devices are oriented to capture pictures, point clouds, video etc. (generally referred to herein as "an image" or "images") of the items stored within containers 36. The image(s) may be transmitted to processor 18 or processor 20 (and in some instances may additionally be relayed to operator interface 66 (shown in FIG. 1). In this manner, the processor may implicitly or explicitly analyze the images and then execute a machine learning algorithm, or a grasping or motion algorithm, located for example within data store 22, to predict a grasping pose (e.g., position and/or orientation and/or posture of the robotic picking arm). The predicted grasping pose may then be transmitted as control instructions to pick and place robot 42 which, when executed by the pick and place robot, causes the gripping tool 62 to approach and attempt to grasp the item. Successfully grasping an item can require a set of consecutively run poses. Nevertheless, as used herein, the term "grasping pose" may refer to a single pose or a set of consecutively run poses. If the control instructions were unsuccessful in grasping the item, the processor can request intervention from the teleoperator, allowing pick and place robot 42 to be teleoperatively controlled. Although operator interface 66 is primarily described herein in connection with assisting pick and place robot 42 in performing a failed pick and place task, it will be appreciated that the operator interface may be used by the teleoperator at any time (including prior to a failed attempt) to allow a teleoperator to manually control or otherwise assist the robot in performing any manipulation task including picking, packing, nudging, relocating or rearranging inventory items within a container 36 or any other order fulfillment task. For this reason, the term control instructions may also include instructions for moving items within a single container, instructions for moving items from one container to another container or instructions for packing an item in a particular location or in a specific orientation within a container to assist in densely packing the items.

Operator interfaces 66 includes one or more input devices to capture control instructions from the teleoperator and one or more output devices. Operator interface 66 may be, for example, a personal computer, a tablet, (smart) phone, or a wearable computer. Exemplary input devices include keyboards, mice, touch screen displays, displays (e.g., LCD or OLED screen), controllers, joysticks and the like. Exemplary output devices include, without limitation, displays (e.g., LCD or OLED screen), head mounted displays, speakers, and/or haptic feedback controllers (e.g., vibration element, piezo-electric actuator, rumble, kinesthetic, rumble motor). Operator interface 66 may thus be utilized by the teleoperator to observe robotic picking and assist the pick and place robot 42 in grasping items during edge case scenarios or to assist with any other order fulfillment task including, without limitation, item manipulation tasks, vehicle driving assistance tasks (e.g., assisting truck 12 along a delivery route) or guiding any of the delivery devices and/or ramps to a drop location.

The gripping tool 62 may be any electrically or pneumatically actuated tool such as a suction cup designed to grasp inventory items. When gripping tool 62 is a suction cup, pick and place robot 42 includes a pneumatic source such as a vacuum source or a compressor (not shown) in fluid communication with the gripping tool. If the pneumatic source is a compressor, a Venturi pump (not shown), or similar device capable of using the compressed air to produce a vacuum or suction force, may be used to generate a suction force for operating the suction cup. There is not a single gripping tool that can optimally handle a large variety of inventory. For this reason, gripping tool 62 may be removably coupleable to picking arm 60 such that pick and place robot 42 may autonomously decide, or be instructed by the teleoperator, to switch between a plurality of different gripping tools. Alternatively, pick and place robot 42 may include a plurality of picking arms each of which are equipped with one or more gripping tools 62 and/or the gripping tool may include a plurality of gripping elements (e.g., distinct elements on a single tool that are individually actuatable and designed to individually grasp an item, or act in concert with one another to grasp the item, such as an array of suction cups and/or actuatable grasping fingers).

Figure 6:
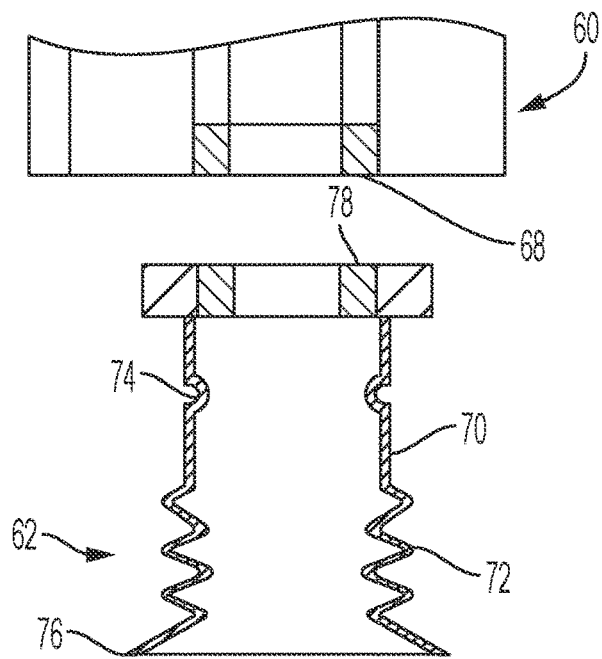
FIG. 6 is a cross-section view illustrating the coupling between a gripping tool and a picking arm of the piece-picking robot of FIG. 1.

Referring to FIG. 6, picking arm 60 includes a magnet 68, such as a ring magnet or another magnet arrangement, to magnetically couple gripping tool 62 to the picking arm. As shown in FIG. 6, gripping tool 62 may be in the form of suction cup and include a sidewall 70 with bellows 72 formed of a resilient material such as rubber and a groove 74 positioned above the bellows. The sidewall 70 of gripping tool 62 is thus configured to compress when the suction cup engages an object. The suction cup may further include a lip 76 formed from a resilient material, which also may be a rubber, such that the lip of the gripping tool is adapted to deform and create a seal with the surface of an item in which it engages. A magnet 78 may be provided on gripping tool 62 to attract the magnet 68 of picking arm 60 and to magnetically couple the gripping tool to the picking arm. In some embodiments, gripping tool 62 may have an additional groove (not shown) that cooperates with a protrusion (not shown) on picking arm 60 to prevent rotational and axial movement of the gripping tool relative to the picking arm when the gripping tool is coupled to the picking arm. In other embodiments, gripping tool 62 may be coupled to picking arm 60 via another mechanical connection such as a push/pull connection or a twist-locked connection.

Figure 7:
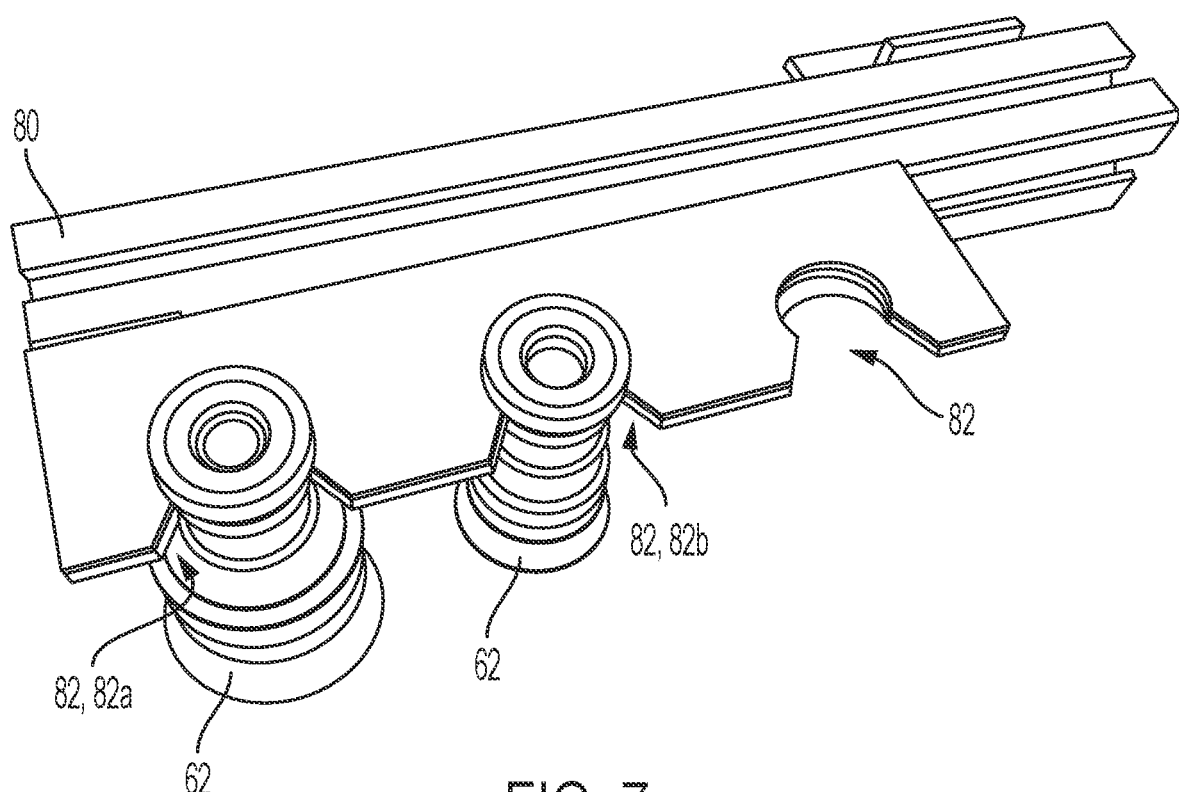
FIG. 7 is a perspective view of a tool holder for storing a plurality of gripping tools interchangeably coupleable to a picking arm of the piece-picking robot of FIG. 1.

A tool holder 80, as shown in FIG. 7, may be attached to pick and place robot 42 or otherwise provided within the picking area of delivery truck 12 near pick and place robot 42. Tool holder 80 may have a plurality of retainers 82a, 82b (collectively "retainers 82") such as arcuate or rectangular cutouts for receiving the groove 74 of gripping tool 62. Tool holder 80 may alternatively define a cup-like holding area in which gripping tool 62 can be housed when not coupled to the picking arm of pick and place robot 42. In this manner, a plurality of different gripping tools 62 can be selectively and interchangeably coupled to the picking arm 60 of pick and place robot 42 based upon the size, shape, material or weight of the product in which the pick and place robot is tasked with grasping. Upon receiving control instructions from processor 18, or operator interface 66, piece picking robot 42 may swap a first gripping tool for a second gripping tool having a different size, material, shape or configuration. To swap gipping tools, picking arm 60 may slide the groove of a first gripping tool attached to the picking arm into the retainer 82a of tool holder 80 before retracting the picking arm to decouple the magnet 68 of the picking arm from the magnet 78 of the first gripping tool. The picking arm 60 of pick and place robot 42 may then be positioned over a second gripping tool, positioned within the retainer 82b of tool holder 80, to magnetically couple the picking arm to the second gripping tool. With the second gripping tool coupled to picking arm 60, the picking arm may be moved laterally to slide the second gripping tool out of retainer 82b. Each gripping tool 62 (or picking arm 60) may include a sensor to detect if the gripping tool has been properly connected to the picking arm 60 and/or whether an inventory item has been successfully grasped.

One or more scanners 83 (shown in FIG. 1) may optionally be attached to pick and place robot 42 or otherwise provided within the picking area of delivery truck 12. Scanner 83 may be communicatively coupled to processor 18 via network device 26 and adapted to scan a barcode, RFID, SKU, or ID on the packaging of an inventory item, or perform an image analysis on the product type, to verify the identity of the item. Thus, after an item has been grasped and before the item has been placed into an order container, scanner 83 can scan the barcode, RFID, SKU, or LOT number and transmit this information to the processor which, in turn, can verify the identity of the item and direct pick and place robot 42 to dispense the item into an appropriate order container pertaining to a particular customer. In one embodiment, an auto-bagging, auto-boxing, or container wrapping, closing or sealing machine may also be provided within the vehicle 12 such that pick and place robot 42 can pick items directly from a container 36 and quickly bag or box the picked items into completed order containers.

Referring back to FIGS. 2A and 2B, robotic system 14 further includes one or more delivery devices such as ramp 41, delivery robot(s) 44 or drone(s) 47. With specific reference to FIG. 2B, ramp 41 may include a conveyor belt 45 designed to deliver an order container to a designated curbside drop zone such as the driveway of a customer without the assistance of delivery robot 44 or drone 47. Ramp 41 may further include arms 43 for engaging with and retrieving empty containers from a pickup location. In an exemplary embodiment, arms 43 may be coupled to opposite sides of ramp 41 such that the arms are extendable away from the ramp 41 of delivery truck 12 and pivotable outwardly to surround an empty container and then subsequently pivotable inwardly to engage and secure the container between the pair of arms before the container is pulled onto the conveyor belt 45 of the ramp.

Delivery robots 44 and drones 47 are designed to transport fulfilled order containers from delivery truck 12 to a drop area at a designated delivery location and, in some instances, retrieve empty containers from a pickup location. Delivery robot 44 may be an autonomous ground vehicle (AGV) that includes a propulsion system 84 and a payload carriage 86 for securing one or more containers 36. In a non-limiting example, propulsion system 84 may include wheels, legs, or be a wheel/leg hybrid with multiple degrees of freedom configured to move payload carriage 86 and, in turn, a container secured to the payload carriage, down the ramp 41 of delivery truck 12 to the designated drop zone such as a doorstep of a customer's residence. Similarly, drones 47 may include a payload carriage for securing one or more order containers as the drone flies through the air from delivery vehicle 12 to a drop location and for storing empty containers after the drone has retrieved the container from a pick-up location. It will be appreciated that delivery robots 44 and drones 47 allow the order containers to be delivered to and/or retrieved from locations that are not directly accessible to delivery truck 12, for example, the doorstep of a residence or a storage locker or mailbox set back from the roadway.

In the event that the drop location is a storage locker, the storage locker may include a lock for securely storing the order containers until the authorized customer retrieves his or her order. In certain aspects, the storage locker may have insulated and climate controlled sections to store items at an appropriate temperature prior to being retrieved by the customer (i.e., the locker may have a refrigerated section, a freezer section and an atmospheric temperature section, or may simply be well insulated). In dense urban areas containing large multi-unit complexes, a common storage locker may house several individual lockers or cubbies.

In an optional embodiment, containers 36 may be arranged within a storage structure or a grid-based storage structure (not shown) provided within the storage area 34 of vehicle 12. The storage structure may be similar to the storage structure disclosed in U.S. Pat. Pub. No. 2021/0032034 which is incorporated herein by reference in its entirety.

Figure 2C:
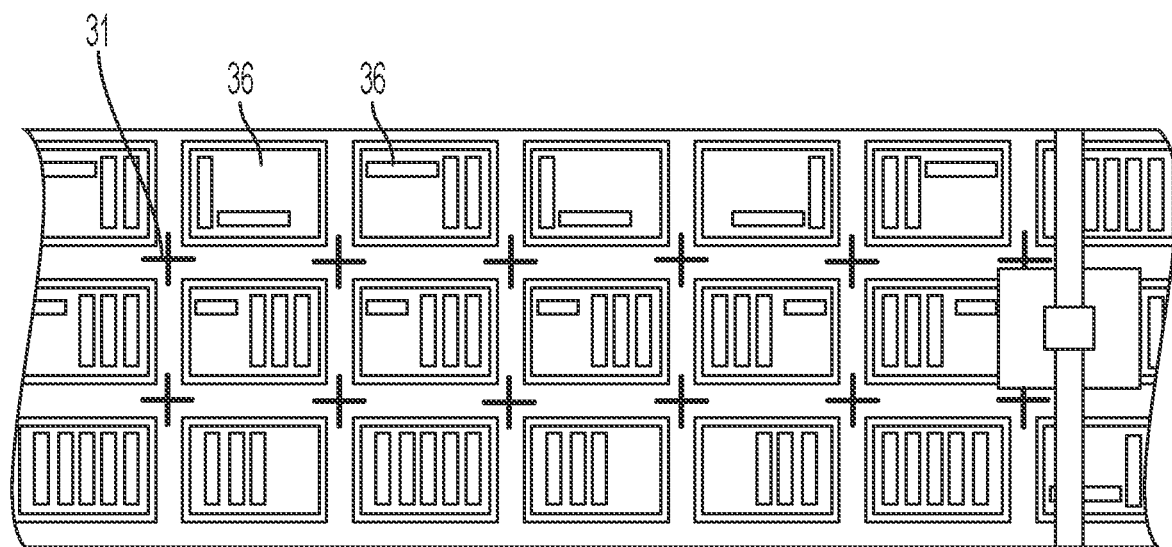
FIG. 2C is a plan view of a storage bed of the delivery vehicle of FIG. 2A provided with an example storage structure for arranging containers.

In a first aspect, the storage structure may include a frame formed entirely of vertical members 31 (shown in FIG. 2C). The vertical members 31 may be disposed between adjacent stacks of containers to prevent the containers from shifting as delivery truck 12 traverses a delivery route. In a second aspect, the storage structure may be formed of the vertical members 31 and additionally include first horizontal members (not shown) extending in a first direction (e.g., in the length direction of the truck) and second horizontal members (not shown) extending in a second direction (e.g., in the width direction of the truck) substantially orthogonal to the first direction. The first and second set of horizontal members may be secured to the vertical members in a plurality of rows to collectively form spaces in which a respective stack of containers 36 may be arranged. The spaces are arranged to reduce, if not eliminate, lateral movement of the containers as the vehicle traverses a delivery route.

A grid may optionally be disposed above either of the earlier mentioned framed storage structures. The grid includes a first set of parallel rails extending in the length direction of the truck and a second set of parallel rails extending in the width direction of the truck to form a plurality of grid spaces. Each stack of containers 36 is designed to sit underneath and completely within the footprint of a single grid space. The first and second set of parallel rails collectively define a profiled track upon which a robotic vehicle may be disposed. The robotic vehicle may include a wheel assembly configured to engage the tracks of the first and second set of rails to selectively move the vehicle above any one of the stacks of containers and a gripper plate, similar to any of the gripper plates disclosed herein, configured to retrieve a target containers 36 as described above with respect to retrieval robot 40.

The vertical members and/or the horizontal members of the storage structure may be sized and arranged to be slightly larger than the gripper plates described herein. In this manner, as the gripper plate is lowered in the z-direction toward a container 36, and within the frame, the vertical and/or horizontal members will prevent the gripper plate from swaying laterally (in x-y directions) and will guide the gripper plate towards the container. Similarly, after the container has been secured, the members of the storage structure will prevent the container from swinging back-and-forth and discharging its contents or colliding with other stacks of containers due to the motion of delivery truck 12 (e.g., turning, breaking, accelerating or hitting a pothole, etc.).

A method of fulfilling and delivering orders using order fulfillment and delivery system 10 and robotic system 14 will now be described. The desired items, for example, groceries may be packaged into order containers and/or storage containers and loaded within the storage area 34 of vehicle 12 at a warehouse or other order fulfillment center. The containers 36 may either be loaded into the truck by a warehouse worker or with assistance of gantry 38, a gantry 38' (shown in FIG. 8), and/or other devices. Gantry 38' may be constructed and operate similarly to gantry 38 with the exception that gantry 38' is not secured within delivery truck 12. Instead, gantry 38' may be provided at any loading/unloading dock and may be on rollers or another mechanism which allows the gantry to be slid into and out from the truck to assist with loading and/or unloading containers 36 from the truck in a more efficient manner than can be performed by a warehouse worker.

Figure 8:
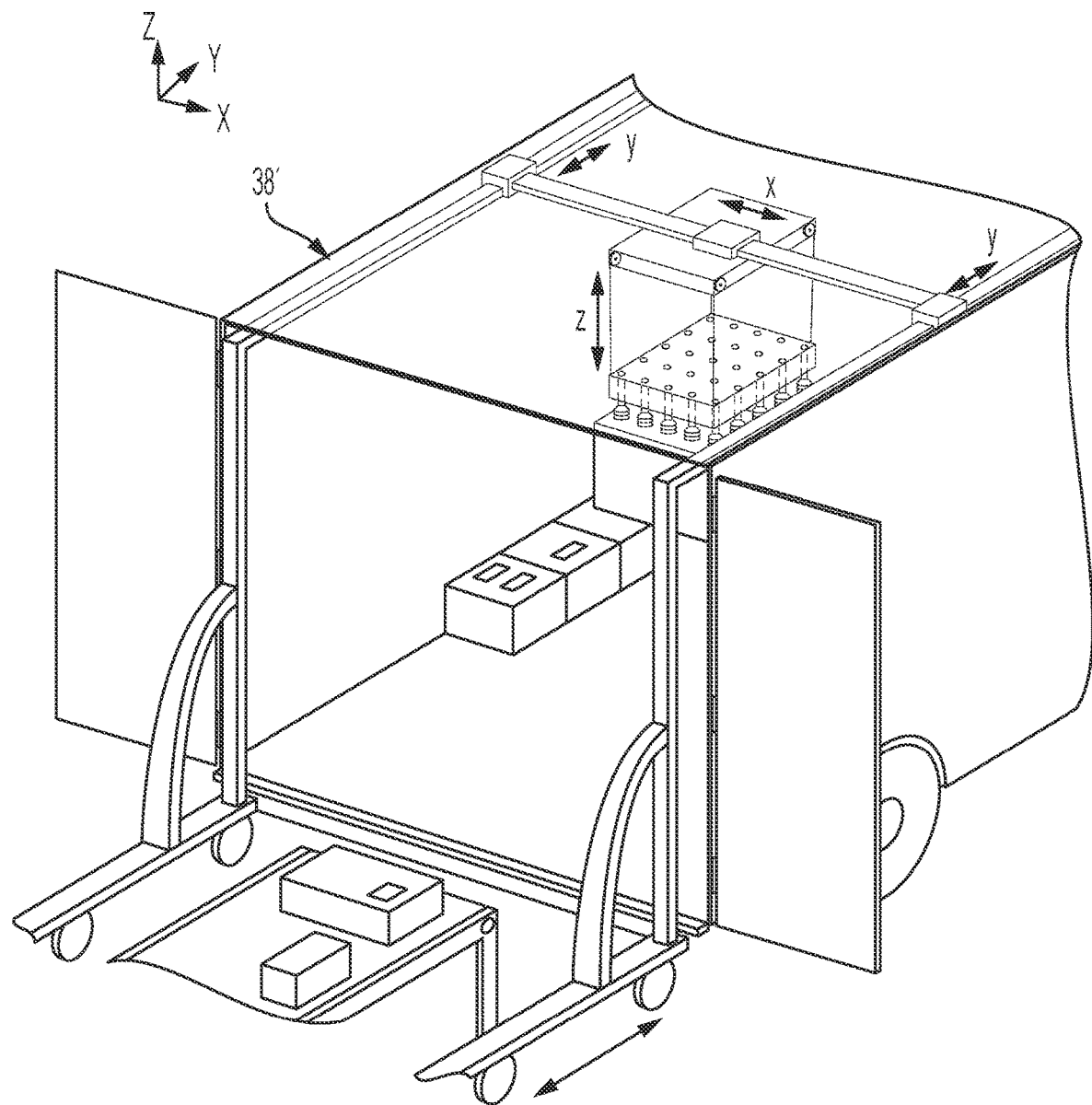
FIG. 8 is a perspective view illustrating a method loading containers into a delivery vehicle using an example gantry according to an embodiment of the present disclosure.

When containers 36 are loaded into a truck by a warehouse worker, the containers may be walked into the storage area 34 and placed adjacent to cab 32 in one or more stacks before other containers are placed behind the earlier placed containers (e.g., toward the rear of delivery truck 12). This process makes stacking containers 36 in orderly stacks more difficult. In contrast, when containers 36 are loaded by gantry 38, the containers may be loaded in levels. In other words, containers 36 may be loaded in one or more rows (along the length of the vehicle) and one or more rows (along the width of the vehicle) before the containers are stacked on top of one another. Loading containers 36 into the storage area 34 of delivery truck 12 in this manner builds a stronger foundation for subsequently loaded containers to be stacked on top of the earlier loaded containers and eases and expedites the stacking process. The foundation building process is made possible by gantry 38 which can pass over one or more rows of boxes to grab another container located in a rear of the truck or located outside of the truck, for example, on a conveyor (as shown in FIG. 8) or within a staging area. It will be appreciated that a warehouse worker who walks along the storage bed of the truck cannot load delivery truck 12 in this manner without stepping on or jumping over the earlier loaded containers or without the assistance of gantry 38.

Other efficient loading methods may alternatively be utilized. For example, containers 36 may be stored within the warehouse on top of a pallet or pod in a series of levels (with little to no space in between adjacent rows of containers). When delivery truck 12 arrives at the warehouse, a fork-lift or other lifting machine can lift and place the entire pallet, including containers 36, into the storage area of the delivery truck for quick replenishment.

It will be appreciated that the storage density of containers 36 may be increased by loading the containers into the storage area 34 of delivery truck 12 with little to no space between adjacent containers. Containers 36 may also be stacked in levels to a height just below retrieval robot 40 or to a height of the lifting device 52 of the retrieval robot. If containers 36 are stacked to the height of retrieval robot 40 (for the purpose of storing more containers) it will be appreciated that the retrieval robot will not be able to freely move a container that it is holding along the full area of the gantry but must rather navigate itself and, in turn the container it is holding, through available spaces on the top layer that are not occupied by other containers. So long as the top level is not completely filled with containers, the retrieval robot can engage a container that it is tasked with retrieving and slide that container between adjacent containers of the top level (e.g., within empty spaces not filled by containers in the top level).

To facilitate efficient delivery, pre-picked or otherwise pre-consolidated order containers may be loaded into vehicle 12, with the assistance of gantry 38, based upon a predetermined delivery schedule. For example, the order containers may be loaded into storage 34, or staging area 33 located adjacent to any one of the delivery devices described herein (e.g., ramp 41, delivery robot 44 or drone 47), based upon the pre-scheduled order of delivery stops. In other words, an order container that is scheduled to be dropped off at the first delivery location may be loaded directly into staging area 33 whereas containers that will be delivered to the last delivery location may be loaded furthest from the staging area. Alternatively, the storage containers and the order containers may be loaded in any other manner, including one that is fastest, and sorted while truck 12 is in transit. For example, the order containers may be grouped within the storage area 34 of vehicle 12 based upon the scheduled delivery order. In this regard, gantry 38 and/or conveyor 61 can continuously and easily move a group of containers scheduled to be delivered within the next few delivery stops to staging area 33 before the delivery truck reaches those stops, thereby allowing the driver and/or any of the delivery devices described herein to quickly collect the containers that it needs to deliver from the staging location instead of sifting through all of the containers within storage area 34 at each delivery location.

In one embodiment, the storage area 34 of delivery truck 12 may be loaded with pre-picked order containers as well as storage containers holding items that may be in high demand for a particular route. For example, if delivery truck 12 is scheduled for a 5 am-8 am route in the summer time, then the truck may include one or more storage containers of iced coffees. In contrast, if delivery truck 12 is scheduled for a 6-9 pm route, then the truck may include, for example, one or more storage containers of ice cream. Still yet, delivery truck 12 may be loaded with non-grocery items, such as new-release products (books, shoes, clothes, electronics, smartphones, etc.), or mail, scheduled to be delivered along the truck's delivery route. Historical and geographical sales data may be analyzed periodically to selectively stock truck 12 with the most in demand inventory for a truck operating on that particular time and day and driving along that particular delivery route.

As delivery truck 12 departs the warehouse, each of the customers that placed an order, as well as previous customers within a predetermined distance of the delivery route, may receive a notification to their consumer device 30 informing the consumers as to the schedule of the delivery truck. By logging onto the delivery service provider's website and/or mobile application, the consumers may view the location of delivery truck 12, as well the orderable inventory on that truck and, other nearby trucks, in real-time. The consumer may then select and purchase one or more desired items and the order will be transmitted to processor 20 which, in turn, will appropriately assign the order to a respective delivery truck 12. For example, if the consumer already purchased a pre-picked order on a particular vehicle 12, processor 20 will assign the new order to that vehicle if it contains the desired item. On the other hand, if the consumer does not have a pre-picked order en route, processor 20 can assign the order to one or more delivery trucks that are presently around the consumers desired delivery location.

While delivery truck 12 is described herein as traversing pre-planned delivery routes, the truck may make deviations therefrom when instructed from processor 20 to deliver orders placed after the pre-planned delivery route was established. In other instances, vehicles 12 may be stationary or patrol certain areas based on instructions from processor 20 and past order history. Each delivery truck 12 is thus designed to deliver "scheduled orders" (orders scheduled prior to the delivery truck leaving the warehouse) and "on-demand orders" (an order that is at least partially placed and fulfilled when the delivery truck is en-route to a delivery location) which may include the supplementation of one or more items to a scheduled order.

Figure 9:
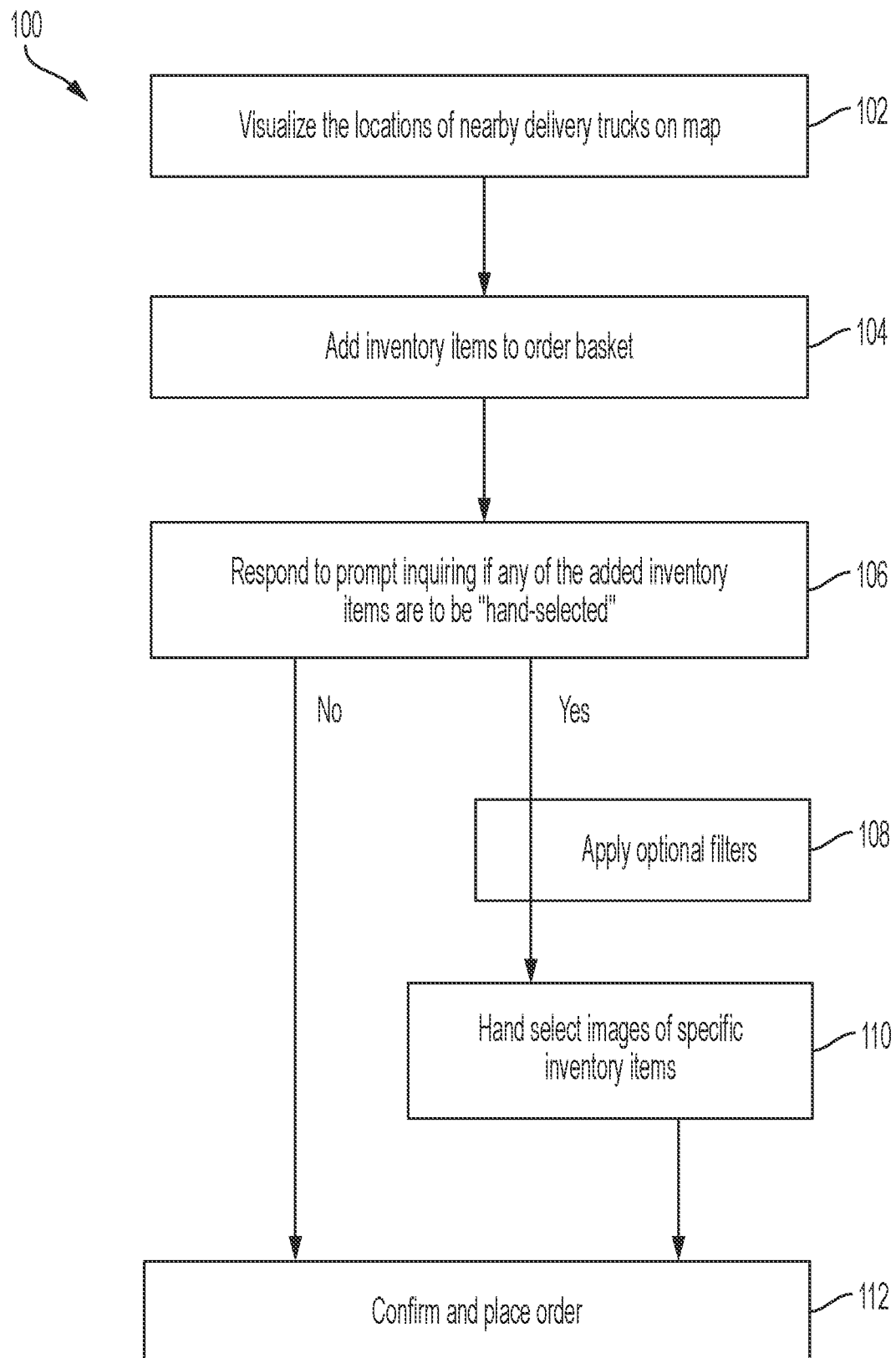
FIG. 9 is a flowchart illustrating an example order placement process.

FIG. 9 is a flow chart 100 illustrating the steps of an example order placement process in further detail. A consumer may place an order, such as a grocery order, on consumer device 30 by accessing the website and/or mobile application (hereinafter "app") of the delivery provider. As shown in block 102, the consumer may visualize, on a map displayed on consumer device 30, the locations of nearby delivery trucks 12 relative to the desired delivery location which may be, for example, the home of the consumer or the consumer's current location.

Using an algorithm that accounts for the then current locations of the trucks, pending orders not yet fulfilled and scheduled delivery routes of the nearby delivery trucks, the app will automatically identify the delivery truck capable of providing the quickest delivery to the consumer. The consumer may then browse the orderable inventory on the identified delivery truck. Alternatively, the consumer can browse for a desired item in a product catalogue containing the orderable inventory across the fleet of deployed delivery trucks. Upon selecting one or more item types and desired quantities thereof from the product catalogue, using the input device of consumer device 30, the desired items and quantity thereof will be displayed in the apps virtual order basket as shown at block 104.

The app's algorithm may then identify the delivery truck capable of most quickly and efficiently delivering the order to the consumer. Before the order is transmitted to that particular delivery truck, the app may transmit a prompt to the user, at block 106, inquiring whether the user wants to "manually-select" or "hand-select" one or more of the items or if the user prefers a "generic item" in which case an item of the type selected will be chosen at random. In the event that the consumer desires to manually-select one or more items, such as a banana, images of the actual bananas available on the identified delivery truck will be output and displayed on consumer device 30. The consumer may then scroll through the images and "manually-select" one or more bananas. In some aspects, as shown in block 108, the app may include one or more filters that may be optionally and selectively applied to the images and that act as a visual aid in determining various properties of the banana such as ripeness, size etc. In the event that the consumer is not satisfied with any of the bananas available on the identified delivery truck, the consumer may skip to the next nearest delivery truck and scroll through the images of bananas available on that truck. At block 110, the consumer may select the image corresponding to a specific item such as a banana. This process can be repeated, as necessary, until a truck(s) is identified that can most quickly and efficiently deliver the order. The consumer may then confirm and place the order, as shown in block 112, and visualize a representation of the delivery truck carrying the consumers order on a map as the delivery truck travels to the delivery location. In some instance, the app may also provide updates, for example, via messages on the app or external SMS messages pertaining to the order fulfillment status.

When an on-demand order has been received by delivery truck 12, retrieval robot 40 may retrieve one or more containers 36 as described hereinafter. For example, if the consumer modified an earlier order (e.g., exchanged, removed and/or added an item to an existing pre-picked order), the gantry can retrieve the order container as well as the storage container(s) holding the desired additional items and transport the containers to the picking area for further processing. On the other hand, if the consumer is placing a new order (e.g., the consumer does not have a pre-picked order on delivery truck 12), gantry 38 may retrieve one or more storage containers and transport the containers to the picking area for further processing.

To remove a target container 36b from the top of a stack, retrieval robot 40 is moved as necessary in the x and y directions so that gripper plate 54, or another appropriate gripper plate, is positioned above the stack in which the desired container is located. Specifically, the cross-connector 48 of gantry 38 may be driven along the beams 46 of the gantry to position retrieval robot 40 over a particular row of containers in which the target container is located. Retrieval robot 40 may then be driven along the cross-connector to align gripper plate 54 to the target container in the x-direction. Gripper plate 54 may then be lowered in the z-direction and brought into engagement with container 36b. Hooks 59 may then be driven by the driving mechanism into engagement with the target container 36b to secure gripper plate 54 to the container. Gripper plate 54 and the container may then be pulled upwards by spooling cables 56. At the peak of its vertical travel, container 36b may be accommodated directly beneath the body 50 of retrieval robot 40 and above the other stacks of containers. In this way, retrieval robot 40 can transport container 36b to one or more picking areas within the truck (e.g., internal picking areas) or to delivery port 35 (e.g., an external picking area). If, on the other hand, target container 36b needs to be removed from a stack of containers when the target container is located beneath non-target containers 36a, retrieval robot 40 is first aligned in the x and y directions with target container 36b as previously described, before the above described "digging operation" is performed to relocate each of the non-target containers and extract the target container. Target container 36b may then be transported to the picking area by gantry 38 or with the assistance of conveyor 61.

Once the storage containers are within one of the picking areas, the customer, driver, passenger, or pick and place robot 42 may pick one or more desired items from the storage container. Pick and place robot 42 picks an item as follows. First, vision device 64 may scan the inventory items located in the retrieved container and the image may be sent to processor 18 or processor 20 for further processing to determine viable grasping and manipulation motions. For example, processor 18 or processor 20 may then implement a policy, which utilizes one or more metrics, checks and filters to select one or more predicted grasping pose candidates for pick and place robot 42 to execute sequentially or to add to its queue. Then, the processor generates a signal including processor readable information that represents the selected grasping pose and sends the signal to the picking arm 60 of pick and place 42. After pick and place robot 42 receives the selected grasping pose signal, the robot executes the signal, causing the picking arm 60 to perform the selected gasping pose. That is, gripping tool 62 approaches the product item, as instructed by the processor and contacts the inventory item.

After the grasping attempt, a sensor of pick and place robot 42, or the processor, may characterize the grasp as either successful or unsuccessful. If the attempt resulted in a successful grasp such that the item was removed from target container 36b and deposited into the order container, the sensor may characterize the pick and place as successful and transmit a successful pick and place signal to the processor via network device 26. On the other hand, if gripping tool 62 was unable to remove the item from the container, or the gripping tool drops the item before the processor instructs the pick and place robot to release the item in the order container, the sensor will characterize the grasp as unsuccessful and transmit an unsuccessful grasp signal to the processor via network device 26. Upon characterizing the grasp as unsuccessful, the processor can either: (1) immediately signal to teleoperator interface 66 and request intervention; or (2) attempt to determine a new grasping pose to autonomously pick up the item based upon a new or modified grasping pose. If the processor elects to autonomously determine a new grasping pose, the steps described above may be repeated until either the grasp is characterized as successful or until intervention is requested. On the other hand, if intervention is requested, a teleoperator may send control instructions to pick and place robot 42 to assist the pick and place robot in grasping and/or packing the product item into the order container, or the teleoperator may send a signal to the driver or passenger located within the cab 32 of delivery truck 12 and request that the driver, passenger, or customer assist in picking and/or packing the product. The control instructions may include any of: 1) determining a location of the item to grasp; 2) determining a grasping pose; 3) selecting the gripping tool to grasp the inventory item; 4) determining the packing pose of the item; 5) repositioning/nudging an item; or 6) performing any manipulation task.

Once the order container has been filled with each ordered item (but for any items to be hand-selected), retrieval robot 40 may move the completed order container to staging area 33 (which may be a subset of the picking area, the storage area, or another location adjacent to an exit of the vehicle such as ramp 41) or to a reserved portion of storage area 34 to conserve space in the staging area for more immediate deliveries. If retrieval robot 40 moves a fulfilled order to the reserved portion of storage area 34, the robot may subsequently stage orders (e.g., move the completed order containers from the reserved area of storage area 34 to staging area 33) prior to the delivery truck 12 reaching the delivery location. Thus, when delivery truck 12 arrives at the delivery location, the delivery devices (e.g., ramp 41, delivery robot 33, operator, or drone 47) may quickly deliver containers 36. For example, upon arriving at a delivery location, ramp 41 may be lowered and aligned with a drop zone. An image feed from alignment camera 39 may assist the self-driving program, the driver or teleoperator in correctly aligning the ramp to the drop zone and lowering the ramp to the correct angle based on the height of the drop zone. If ramp 41 is initially misaligned, truck 12 may be driven to correctly align the ramp. In this regard, order containers 36 may be quickly placed on the conveyor belt 45 of the ramp which can be actuated to deliver the container to a curbside delivery location. Alternatively, one of the autonomous delivery robots 44 or drones 47, gantry 38 can grab the order container from staging area 33 and transport the container to a designated drop spot such as the door step of the consumer. If multiple consumers in a single neighborhood placed orders, a plurality of autonomous delivery devices may be used to simultaneously deliver/retrieve orders to increase efficiency. The delivery devices may also retrieve empty containers (that were previously delivered to customers in that particular neighborhood) while delivering containers of new orders.

In the event that a customer prefers to "hand-select" one or more items, the customer may prompt the app to send a delivery truck 12 to the customer's location. Using consumer device 30 or interface 28, the customer can select one or more items to hand-select. In response to the selection, robotic system 14 or robotic system 16, will retrieve a container housing the selected items, as described above, and transport the retrieved container to the port (e.g., picking location) through which the inventory items can be presented. The customer may pick the desired quantity of items from the container and, when finished, prompt the system to return the container to a location within delivery truck 12. If necessary, robotic system 14 or robotic system 16 can continue to present containers (of the same item type or of a different item type) until the customer has hand-selected all of the desired items. The camera 37 or other detection device may automatically detect the items and the quantity of the items taken by the customer so that the customer's account can be debited accordingly. Truck 12 may thus serve as a mobile store provided with a robotic system that retrieves products for the consumer to hand-select and purchase.

Figure 10:
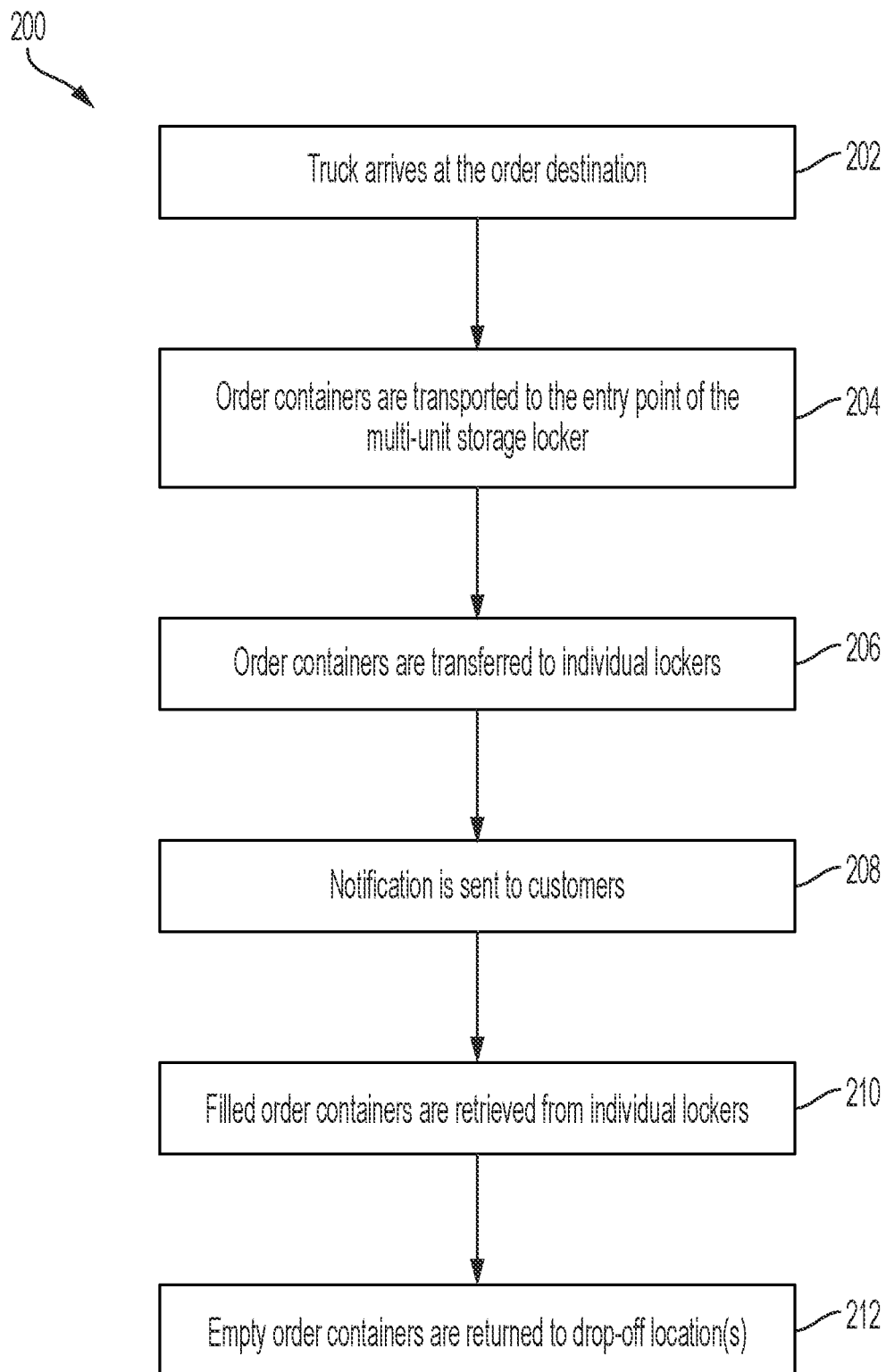
FIG. 10 is a flowchart illustrating an example order delivery process.

FIG. 10 is a flow chart 200 illustrating the steps of an example process of delivering one or more orders to a multi-unit storage locker. The process begins, at block 202, when delivery truck 12 arrives at the delivery location with the order(s) staged in the staging area 33 of the truck. At block 204, the fulfilled order container may be can transported directly to one or more entry points of the storage locker using any of the delivery devices described herein such as ramp 41, delivery robot 44, drone 47, or another delivery device associated with the truck such as gantry 38. Alternatively, the storage locker may have a retrieval device such as a conveyor, a mobile robot, or a gantry system for retrieving order containers from truck 12 without assistance from ramp 41, delivery robot 44, drone 47, the gantry 38 or another delivery devices associated with the truck. A worker or an Automated Storage and Retrieval System (ASRS), such as a single or multi-axis shuttle, may then transfer each of the order containers, at block 206, from the entry point of the multi-unit storage locker into an individual lockers or cubbies which may then be locked or otherwise secured to prevent unauthorized entry. At block 208, the consumers may receive an SMS message, email, or the like ("Notification"), informing them that their order was delivered. Alternatively, the notification may be sent earlier in the process to inform the customer about the expected delivery time. The Notification may also include a personalized key code which can be used to open the lock placed on the customer's individual locker or cubby. Using the personalized code provided in the Notification, the customer may access their individual storage locker and retrieve the container containing their order, at block 210, before returning the empty container, at block 212, either to their individual storage locker or a central drop-off location within the multi-unit storage locker.

Figure 11:
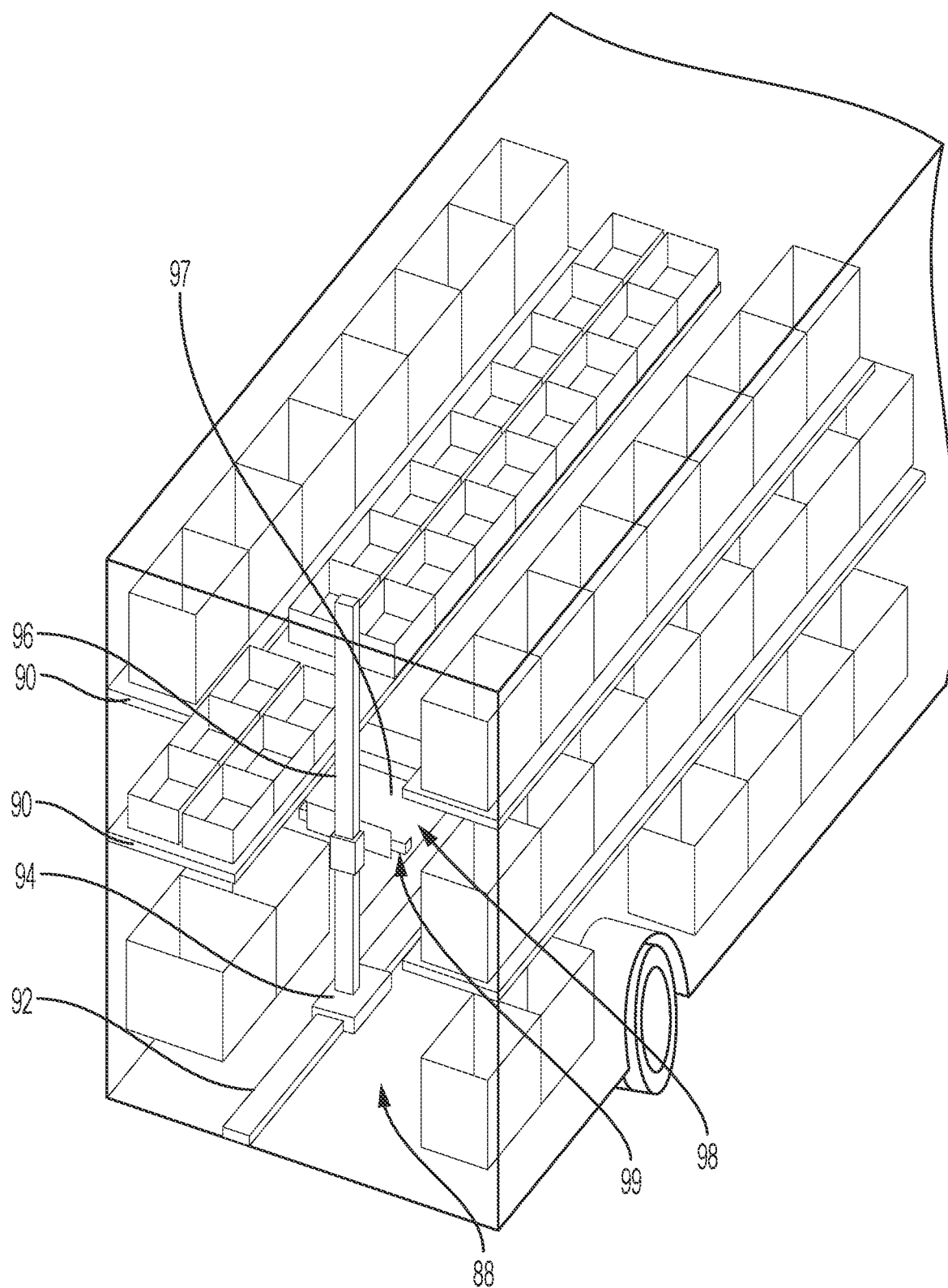
FIG. 11 is a partial perspective view of an example automated delivery vehicle according to another embodiment of the present disclosure.

FIG. 11 illustrates an alternative embodiment of delivery truck 12 that includes robotic system 16 instead of robotic system 14. Robotic system 16 includes all of the features of robotic system 14 but replaces gantry 38 and retrieval robot 40 with a multi-axis shuttle 88. For this reason, containers 36 may be housed on shelving 90 provided on the lateral walls of the storage area 34 of delivery truck 12. To increase storage density, containers 36 may be arranged in multiple rows on a single shelf (e.g., in a width direction of the truck) as shown in FIG. 11.

Shuttle 88 includes a track 92 extending along the storage bed (or the ceiling) of vehicle 12 (in the y direction), a base 94 that is slidable along the track, a vertical post 96, a platform 98 that is slidable along the post (in the z direction) and a pair of opposing arms 99. Shuttle 88 is also communicatively coupled to processor 18 and/or processor 20 via network 26 and thus is able to be autonomously controlled by the processor.

The base 94 of shuttle device 88 may additionally include one or more rollers and actuators to assist the base in sliding along track 92. Post 96 is attached to the base 94 of shuttle 88 and may be oriented in a substantially vertical direction away from the base. Platform 98 is coupled to post 96 along a track or via another mechanism, for example, a system of one or more rollers, linear bearings and guides, linear actuators, lead or ball screws, belts or chain transmissions and actuators (not shown), or similar mechanisms, configured to controllably move the platform along the post in a vertical direction. Put another way, platform 98 can be moved to any location along the length of truck 12 by moving the base 94 along the track 92 and the platform can be moved to any location along the height of the truck by adjusting the height of the platform along post 96.

The arms 99 may be utilized to engage a container 36 located on either side of shuttle 88 and to pull the container onto an upper surface of platform 98. For example, the pair of arms 99 may be coupled to opposite sides of platform 98 such that the arms are extendable away from the platform (in the x-direction) toward shelving 90 and pivotable outwardly to surround a target container and then subsequently pivotable inwardly to engage and secure the container between the pair of arms. Alternatively, arms 99 may include a suction system, hooks or another mechanism for securing the top or sides of containers 36 and pulling the container onto platform 98. To displace a container 36 (or an item) provided on the platform 98 of shuttle 88 back onto shelving 90 (or a container stored on the shelving), the platform may optionally include a push tray 97, a cross-belt, or another similar mechanism capable of dispensing the container from the platform onto the shelving.

In a further embodiment (not shown), shuttle 88 may also include a picking arm, similar to picking arm 60, to pick directly from a target container 36*b* that has been pulled onto platform 98. In this manner, orders of a single item, or relatively few items, can quickly be fulfilled without having to transport the entire storage container to the picking area. In yet another embodiment (not shown), a track may extend along the front side of each shelf in the y direction of delivery truck 12. A platform, similar to platform 88, may be coupled to each one of the tracks such that the platform is configured to slide directly along the shelving to retrieve containers 36. In this embodiment, each of the platforms are movable only in the y direction and configured to pull/push containers in the x direction. Put differently, the platforms are not movable in the z-direction. Therefore, a platform is preferably coupled to each shelf.

Use of robotic system 16 to fulfill orders will now be described only with reference to retrieving a target container 36 from the storage area 34 of truck 12 and transporting the retrieved container to the picking area of the truck as the rest of the order fulfillment process is the same as the order fulfillment process previously described above with respective to robotic system 14. After the control instructions have been transmitted to shuttle 88, the control instruction may be executed, causing the base 94 of shuttle device 88 to slide along track 92 and platform 98 to move along post 96 to position the platform laterally adjacent to a target container 36*b* (e.g., in the y and z directions). If target container 36*b* is located behind a non-target container 30*a*, shuttle 88 may move the non-target containers from one shelf to another shelf (or an open location on the same shelf) in order to access the target container behind the non-target container. The platform 98 may then be returned to a location located laterally adjacent to target container 36*b*. Arms 99 may then be pivoted outwardly and extended toward the target container 36*b* before the arms are subsequently pivoted inwardly to secure the target container between the arms. The arms 99 of shuttle 88 may then be retracted to position container 36 on platform 98 which may then transport the container to the picking area. With container 36 located in the picking area, arms 99 or push tray 97 may be actuated to release the container at a location adjacent to pick and place robot 42.

Although delivery vehicle 12 is primarily described herein as a delivery truck, it is again reiterated that the term "vehicle" is inclusive of any apparatus configured to convey a person or item whether by land, water or air. Similarly, while the delivery devices such as ramp 41, delivery robot 44 or drone 47 are suited to transport order containers from truck 12 across land to a drop zone, the term delivery device is inclusive of any operator, operator controlled robotic system, or autonomous device suitable for delivering the order containers from the delivery vehicle across land, water or through the air and to the delivery location. For example, in embodiments in which delivery vehicle 12 is a blimp provided with robotic system 14, the delivery device may be gantry 38 itself, which can deliver the order containers to a drop zone located on the ground, by winding and unwinding cables 56 into and out from the body 50 of retrieval robot 40 to move gripper plate 54 in the z-direction, or any other delivery device configured to transport the delivery devices through the air.

The order fulfillment and delivery systems described herein are thus designed to deliver orders to consumers more quickly and with reduced operating costs compared to traditional delivery systems. Consumer satisfaction may be further increased as orders can be added to or modified much later in the order fulfillment process without additional and costly delivery fees.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of fulfilling and delivering orders, comprising:
   receiving, by one or more remote processors, an order;
   identifying, by the one or more remote processors, a delivery vehicle configured to fulfill and deliver the order;
   transmitting, by the one or more remote processors, the order to the identified delivery vehicle;
   generating, by one or more processors associated with the identified delivery vehicle, instructions for a robotic system to perform, the robotic system including a container retrieval device disposed at least partially within a storage area of the identified delivery vehicle;
   providing, by the one or more processors associated with the identified delivery vehicle, the instructions to the robotic system as the identified delivery vehicle traverses a delivery route;
   extending the container retrieval device to engage a container;
   moving the engaged container from the storage area of the identified delivery vehicle to a picking area; and
   picking an item from the container.

2. The method of claim 1, wherein the picking step is performed by a driver, a passenger of the identified delivery vehicle, or a customer.

3. The method of claim 1, wherein the picking step is performed by a pick and place robot provided at the picking area, the pick and place robot including a picking arm and a gripping tool configured grasp the item.

4. The method of claim 3, wherein the pick and place robot performs the picking step in response to pick and place control instructions generated by an operator interface.

5. The method of claim 1, wherein the extending and moving steps are performed by a retrieval robot having a body movably mounted on a gantry and a gripper plate extendable and retractable in a vertical direction.

6. The method of claim 1, wherein the extending and moving steps are performed by a multi-axis shuttle.

7. The method of claim 1, further comprising transporting the container using a delivery device, after the picking step, from the identified delivery vehicle to a drop zone located at a delivery location.

8. The method of claim 1, wherein the picking area is a port provided on a delivery truck.

9. The method of claim 8, wherein the picking step comprises a customer hand-selecting an inventory item.

10. The method of claim 1, wherein the order is a new order or a modification of an earlier placed order.

11. An order fulfillment and delivery system for a plurality of delivery vehicles, each of the delivery vehicles comprising a container retrieval device movable in at least two dimensions to engage and move a storage container from a storage area of the delivery vehicle to a picking area of the delivery vehicle, the system comprising:
one or more remote processors configured to:
receive an order;
identify one of the plurality of delivery vehicles configured to fulfill and delivery the order; and
assign the order to the identified one of the plurality of delivery vehicles; and
one or more processors associated with the identified one of the plurality of delivery vehicles configured to:
generate container retrieval instructions for the container retrieval device of the identified one of the plurality of delivery vehicles to perform, the retrieval instructions including moving the storage container including at least one inventory item pertaining to the order from the storage area of the identified delivery vehicle to the picking area of the identified delivery vehicle; and
transmit the retrieval instructions to the container retrieval device while the identified one of the plurality of delivery vehicles traverses a delivery route.

12. The system of claim 11, further comprising the plurality of delivery vehicles.

13. The system of claim 11, wherein the container retrieval device is a retrieval robot having a body movably mounted on a gantry and a gripper plate extendable and retractable in a vertical direction.

14. The system of claim 11, wherein the container retrieval device is a multi-axis shuttle.

15. The system of claim 11, wherein the picking area of the identified delivery vehicle comprises a port.

16. The system of claim 11, further comprising a pick and place robot located within the picking area.

17. A method of fulfilling and delivering orders, comprising:
receiving, by one or more remote processors, an order;
identifying, by the one or more remote processors, a delivery vehicle configured to fulfill and deliver the order;
transmitting, by the one or more remote processors, the order to the identified delivery vehicle;
generating, by one or more processors associated with the identified delivery vehicle, instructions for a robotic system to perform, the robotic system including a container retrieval device disposed at least partially within a storage area of the identified delivery vehicle;
providing, by the one or more processors associated with the identified delivery vehicle, the instructions to the robotic system as the identified delivery vehicle is en route to a delivery location;
extending the container retrieval device to engage a container;
moving the engaged container; and
picking an item from the moved container.

18. The method of claim 17, wherein the order is a new order or a modification of an earlier placed order.

19. The method of claim 17, wherein the extending and moving steps are performed by a retrieval robot having a body movably mounted on a gantry and a gripper plate extendable and retractable in a vertical direction.

20. The method of claim 17, wherein the extending and moving steps are performed by a multi-axis shuttle.

* * * * *